United States Patent
Satterfield et al.

(10) Patent No.: US 8,327,248 B2
(45) Date of Patent: *Dec. 4, 2012

(54) VOTER TESTER FOR REDUNDANT SYSTEMS

(75) Inventors: Harold William Satterfield, Rockledge, FL (US); Grady M. Wood, Satellite Beach, FL (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,302

(22) Filed: Jun. 22, 2012

(65) Prior Publication Data

US 2012/0272109 A1   Oct. 25, 2012

Related U.S. Application Data

(63) Continuation of application No. 12/604,292, filed on Oct. 22, 2009, now Pat. No. 8,209,591.

(60) Provisional application No. 61/107,956, filed on Oct. 23, 2008.

(51) Int. Cl.
*G06F 11/08* (2006.01)

(52) U.S. Cl. .......................... 714/797; 714/760

(58) Field of Classification Search ............... 307/18, 307/115; 714/797, 760, 774, 708, 761; 370/318, 370/205

See application file for complete search history.

(56) References Cited

U.S. PATENT DOCUMENTS

| | | | | |
|---|---|---|---|---|
| 3,725,818 | A | * | 4/1973 | Nurmohamed et al. ... 330/124 D |
| 4,665,522 | A | * | 5/1987 | Lala et al. ..................... 714/797 |
| 4,697,093 | A | | 9/1987 | Sutherland et al. |
| 4,752,869 | A | * | 6/1988 | Miller et al. ..................... 700/82 |
| 5,274,554 | A | * | 12/1993 | Takats et al. .................. 701/29.2 |
| 5,377,205 | A | * | 12/1994 | Shi ................................. 714/797 |
| 5,498,912 | A | | 3/1996 | Templeman et al. |
| 5,753,927 | A | | 5/1998 | Schneider |
| 6,253,348 | B1 | | 6/2001 | Davidsson et al. |
| 6,910,173 | B2 | | 6/2005 | Mitra |
| 7,190,090 | B2 | | 3/2007 | Shi |

* cited by examiner

*Primary Examiner* — David Ton
(74) *Attorney, Agent, or Firm* — Fogg & Powers LLC

(57) ABSTRACT

A tester is configured to access and test each redundant channel of a voter. The tester is disposed between the voter and a multitude of redundant circuits supplying redundant channel signals to the voter. The tester includes a number of input ports receiving the redundant channel signals as well as the test signals. In response to a number of logic combinations of the test signals, the voter generates output signals each corresponding to one of the redundant channel signals. In response to other logic combinations of the test signals, the voter generates a voted output signal. The voter is optionally a majority voter.

16 Claims, 2 Drawing Sheets

VOTER TESTER FOR REDUNDANT SYSTEMS

CROSS REFERENCE TO RELATED APPLICATIONS

This application is a continuation of U.S. application Ser. No. 12/604,292 filed on Oct. 22, 2009 (the '292 Application), which claims the benefit of U.S. Provisional Application No. 61/107,956 filed on Oct. 23, 2008 (the '956 Application). The '292 Application and the '956 Application are incorporated herein by reference.

DETAILED DESCRIPTION OF THE INVENTION

In accordance with embodiments of the present invention a voter tester disposed between a voter and a multitude of redundant circuits is configured to enable testing of the individual input channels of the voter. A test enable/disable signal applied to the voter tester is optionally used to trigger the testing operations. One or more of the logic gates disposed in the voter tester are adapted to withstand single event transients.

Figure 1:
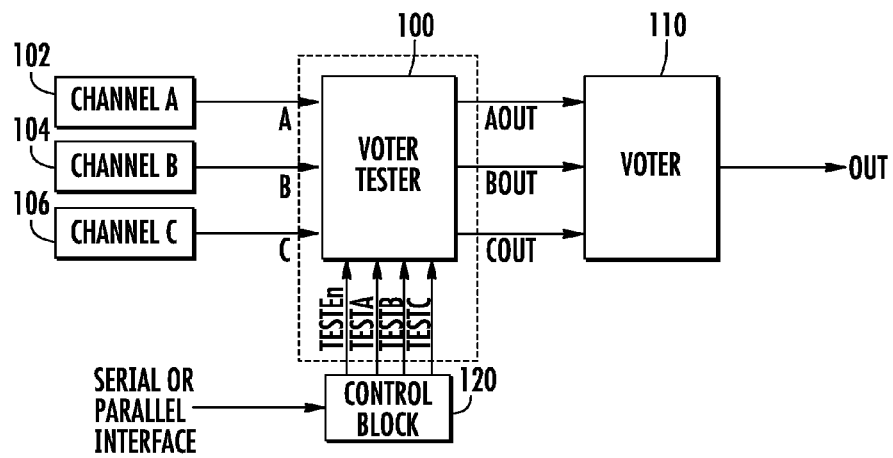
FIG. 1 is a block diagram of a voter tester, in accordance with one exemplary embodiment of the present invention.

FIG. 1 shows an exemplary voter tester 100 adapted to enable testing of each redundant input channel of voter 110, in accordance with one embodiment of the present invention. A voter tested using a voter tester, in accordance with embodiments of the present invention, may be a majority voter, an m-out-of-n voter, a weighted voter, a threshold voter, or the like. In the exemplary embodiment described below, voter 110 is assumed to be a 2-out-of-3 voter, thus requiring 2 of its 3 redundant channels to change before changing its output. The redundant channels may represent, for example, alarm or monitoring conditions, equivalent signals or data processors operating in parallel in a fault-tolerant systems, or the like.

Redundant circuits 102, 104 and 106, which are substantially similar to and operate independently of one another, deliver output signals A, B, and C to voter tester 100 (hereinafter alternatively referred to as tester). Therefore, under ideal conditions, signals A, B, and C will be the same. However, due to a temporary fault, such as a single event transient in a satellite, or a permanent fault within one of the 3 redundant circuits, one of the A, B, or C signals may be changed to an incorrect value.

Voter 110 is a 2-out-of-3 voter that receives digital signals Aout, Bout and Cout, and in response generates an output signal Out. Accordingly, if two or more of voter 110's input signals Aout, Bout, and Cout are at a logic low level, voter 110's output signal Out is also at a logic low level. Similarly, if two or more of voter 110's input signals Aout, Bout, and Cout are at a logic high level, voter 110's output signal Out is also at a logic high level.

The voter and redundant signals A, B, and C from redundant circuits 102, 104, and 106 provide fault tolerance; however, it is also desired to be able to detect if a fault is present. Tester 100 is adapted to allow for detection of such faults at the output of voter 110, in accordance with embodiments of the present invention and as described further below.

Tester 100 is disposed between the redundant circuits 102, 104, 106 and voter 110. Tester 100 is adapted to cause the output signal Out of voter 110 to vary in accordance with the test signals TestEn, TestA, TestB, and TestC applied to tester 100. To achieve this, tester 100 is adapted to cause voter 110's output to be set either to signals A, B, C or alternatively to be set in accordance with the normal voter operation. This allows each of the three redundant circuits 102, 104 and 106 to be tested independently and to determine whether a fault is present. Some embodiments of tester 100 do not receive the test enable/disable signal TestEn and only receive test signals TestA, TestB, and TestC when a three-channel voter is used.

Control block 120 is adapted to supply the test signals to tester 100. Control block 120 may receive corresponding test signals via any number of ports, such as a serial port, e.g., an $I^2C$ bus, a serial peripheral interface (SPI) data link, or a parallel signal interface. In one embodiment of the present invention, the redundant circuits may be tested at the die level. In another embodiment, the redundant circuits may be tested at the package level. Table I below is an exemplary truth table defining the logic relationships among the various logic signals shown in FIG. 1.

TABLE 1

Truth Table for the Voter Tester (X = don't care").

| Inputs | | | Voter Tester Control Signals | | | | Voter Tester Outputs | | | Voter Output Voter Out |
|---|---|---|---|---|---|---|---|---|---|---|
| A | B | C | TestEn | TestA | TestB | TestC | Aout | Bout | Cout | (Majority Rule) |
| A | B | C | 0 | X | X | X | A | B | C | Normal Majority Voter Operation (allows fault on TestA, TestB, or TestC signal) |
| A | B | C | 1 | 0 | 0 | 1 | 0 | 1 | C | Majority Voter Output = C |
| A | B | C | 1 | 0 | 1 | 0 | 0 | B | 1 | Majority Voter Output = B |
| A | B | C | 1 | 1 | 0 | 0 | A | 0 | 1 | Majority Voter Output = A |

TABLE 1-continued

Truth Table for the Voter Tester (X = don't care").

| Inputs | | | Voter Tester Control Signals | | | | Voter Tester Outputs | | | Voter Output Voter Out |
|---|---|---|---|---|---|---|---|---|---|---|
| A | B | C | TestEn | TestA | TestB | TestC | Aout | Bout | Cout | (Majority Rule) |
| A | B | C | 1 | 0 | 0 | 0 | A | B | C | Normal Majority Voter Operation (allows fault on TestEn signal) |
| A | B | C | 1 | Other Combinations | | | X | X | X | Invalid input combinations (output not defined) |

As shown in Table I, when the test signals TestEn is at a logic low level, voter 110 is in the normal mode of operation, accordingly, voter 110's output signal is defined by the majority voter of the signals A, B and C. When the test signal TestEn is at a logic high level, i.e., the test mode is invoked, voter 110 becomes responsive to the test signals TestA, TestB, and TestC. While in the test mode, if signals TestA, TestB and TestC are respectively set to 0, 0, 1, signals Aout, Bout and Cout, are respectively set to 0, 1 and C. Accordingly, majority voter 110's output will be the same as signal C. While in the test mode, if signals TestA, TestB and TestC are respectively set to 0, 1, and 0, signals Aout, Bout and Cout, are respectively set to 0, B and 1. Accordingly, voter 110's output will be the same as signal B. While in the test mode, if signals TestA, TestB, and TestC are respectively set to 1, 0, 0, signals Aout, Bout, and Cout are respectively set to A, 0, and 1. Accordingly, voter 110's output will be the same as signal A. In other words, in response to at least three logic combinations of the voter tester signals, the voter 110's output signal is defined by one of its inputs A, B, and C. While in the test mode, if signals TestA, TestB and TestC are all set to 0, signals Aout, Bout and Cout, are respectively set to A, B and C. Accordingly, in response to at least one logic combination of the voter tester input signals, voter 110's output signal is defined by the majority voter of its input signals A, B and C. The output of voter 110 is undefined for any other combination of signals, as shown in Table I above.

Table 1 also demonstrates the additional fault tolerance due to the inclusion of the TestEn control signal. In normal operation the test control signals TestEn, TestA, TestB, and TestC are logic 0. For the first table entry, with TestEn=0 the voter output provides normal voter operation even if one or more of the TestA, TestB, or TestC signals are faulted and become a logic high. Similarly, the second-to-last entry in the table shows that a fault causing TestEn to become high provides normal voter operation. Therefore, a single fault of the test control signals (TestEn, TestA, TestB, or TestC) does not disrupt the normal majority voter operation.

Figure 2:
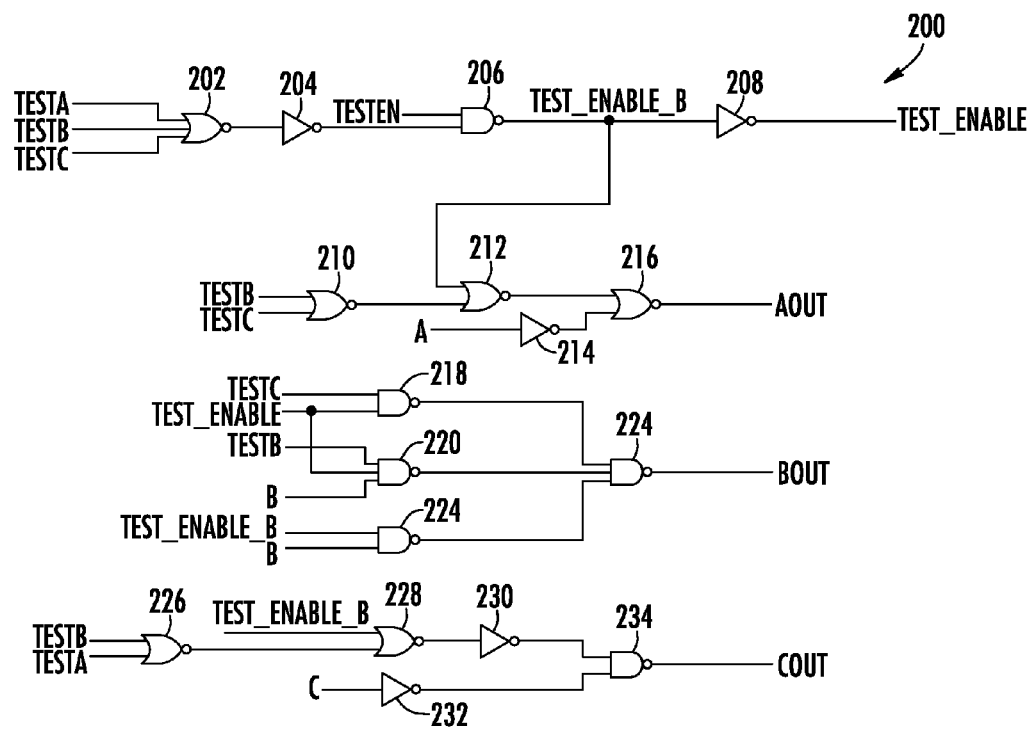
FIG. 2 is a logic block diagram of the voter tester of FIG. 1, in accordance with one exemplary embodiment of the present invention.

FIG. 2 shows various logic gates of one exemplary embodiment of tester 100. As described above, natural or man-made radiation on earth, and cosmic rays in space may change a signal and thus cause errors. For example, when a high energy particle strikes a semiconductor device, the induced charge may temporarily change the value at the output of a digital circuit from a logic high to a logic low level or vice versa. Accordingly, some embodiments of the present invention use logic elements that are resistant to single event transients (SET). For example, inverter 208 that generates signal Test_enable, and NAND gate 206 that generates signal Test_enable_b may be SET hardened logic gates. The SET hardening of logic gates inverter 208 and NAND 206 ensures that a SET within the tester 100 only alters one of the output signals Aout, Bout, or Cout; and therefore does not alter the normal majority voter 110 output. In one embodiment, tester 100 may be immune to a linear energy transfer (LET) of up to and including 80 MeV-cm$^2$/mg.

When signal TestEn is at a low logic level, signals Test_enable_b and Test_enable are respectively at logic high and low levels. Accordingly, the output of NOR gate 212 is at a low logic level, which in turn, causes signal Aout to be the same as signal A. Likewise, the outputs of NAND gates 218 and 220 are at a logic high, which in turn, causes signal Bout to be the same as signal B. The high logic level of signal Test_enable_b causes the output of inverter 230 to be at a logic high level, which in turn causes signal Cout to be the same as signal C. Consequently, when signal TestEn is at a low logic level, signals Aout, Bout and Cout are respectively set to signals A, B and C, irrespective of the values of signals TestA, TestB and TestC, as shown in Table I above.

When signal TestEn is set to a high logic level, signals TestA, TestB are set to a low logic level, and signal TestC is set to a logic high level, the following events occur. Because signal TestC is at a logic high level, the output of NOR gate 202 is set to a logic low level. Therefore, signals Test Enable_b and Test_Enable are respectively set to logic low and logic high levels. The high logic level of signal TestC also causes the output of NOR gate 210 to go low (a low logic level). Because both inputs of NOR gate 212 are low (a low logic level) its output goes high, in turn, setting signal Aout to a low level. Because both signals TestC and Test_Enable are high, the output of NAND gate 218 goes low, which in turn causes signal Bout to go high. Furthermore, because signals TestA and TestB are low, the output of NOR gate 226 goes high, in turn, causing the output of NOR gate 228 and inverter 230 to go low and high, respectively. This causes signal Cout generated at the output of NAND gate 234 to be the same as signal C.

When signal TestEn is set to a high logic level, signals TestA, TestC are set to a logic low level, and signal TestB is set to a logic high level, the following events occur. Because signal TestB is at a logic high level, the output of NOR gate 202 is set to a logic low level. Therefore, signals Test_Enable_b and Test_Enable are respectively set to logic low and logic high levels. The high logic level of signal TestB also causes the output of NOR gate 210 to go low. Because both inputs of NOR gate 212 are low its output goes high, in turn, setting signal Aout to a low level. Because signal TestC is low, the output of NAND gate 218 goes high. Likewise, because signal Test_enable_b is low, the output of NAND gate 224 goes high. Since signals TestB and Test_enable are both high, the output of NAND gate 220 is the inverse of signal B. Consequently, the output of NAND gate 224, namely signal Bout is the same as signal B. Furthermore, because signal TestB is high, the output of NOR gate 226 goes low, in turn, causing the outputs of NOR gate 228 and inverter 230 to go high and low, respectively. This causes signal Cout generated at the output of NAND gate 234 to go high, as shown in Table I above.

When signal TestEn is set to a high logic level, signals TestB, TestC are set to a logic low level, and signal TestA is set to a logic high level, the following events occur. Because signal TestA is set to a logic high level, the output of NOR gate 202 is set to a logic low level. Therefore, signals Test_Enable_b and Test_Enable are respectively set to logic low and logic high levels. The low logic levels of signal TestB and TestC cause the output of NOR gate 210 to go high, in turn, causing the output of NOR gate 212 to go low which, in turn, enables signal Aout to be the same as signal A. Because signals TestC, TestB and Test_Enable_b are low, the outputs of NAND gates 218, 220 and 224 are high, in turn causing signal Bout to go low. Furthermore, because signal TestA is high, the output of NOR gate 226 goes low, in turn, causing the outputs of NOR gate 228 and inverter 230 to go high and low, respectively. This causes signal Cout generated at the output of NAND gate 234 to go high, as shown in Table I above.

When signal TestEn is at a high logic level, and signals TestA, TestB, TestC are set to a logic low level, the following events occur. Because signals TestA, TestB and TestC are all at a logic low level, the output of NOR gate 202 goes high. Therefore, signals Test_Enable_b and Test-Enable are respectively set to logic high and low levels, respectively. The high logic level of signal Test_enable_b causes the output of NOR gate 212 to go low. This, in turn, enables signal Aout to be the same as signal A. Because signal Test_enable is low, the outputs of NAND gates 218 and 220 are at high logic levels. Furthermore, because signal Test_enable_b is high, the output of NAND gate 224 is the same as the inverse of signal B. Therefore, signal Bout is the same as signal B. Because signals TestB and TestA are both low, the output of NOR gate 226 goes high, in turn, causing the outputs of NOR gate 228 and inverter 230 to go low and high, respectively. This causes signal Cout generated at the output of NAND gate 234 to be the same as signal C, as shown in Table I above. As is seen from FIG. 2, the delay paths from signal A to signal Aout, from signal B to signal Bout, and from signal C to signal Cout include only two logic gate to ensure similar gate delays for these three signal paths. This is done to minimize any skew of their transition edges with respect to each other.

Figure 3:
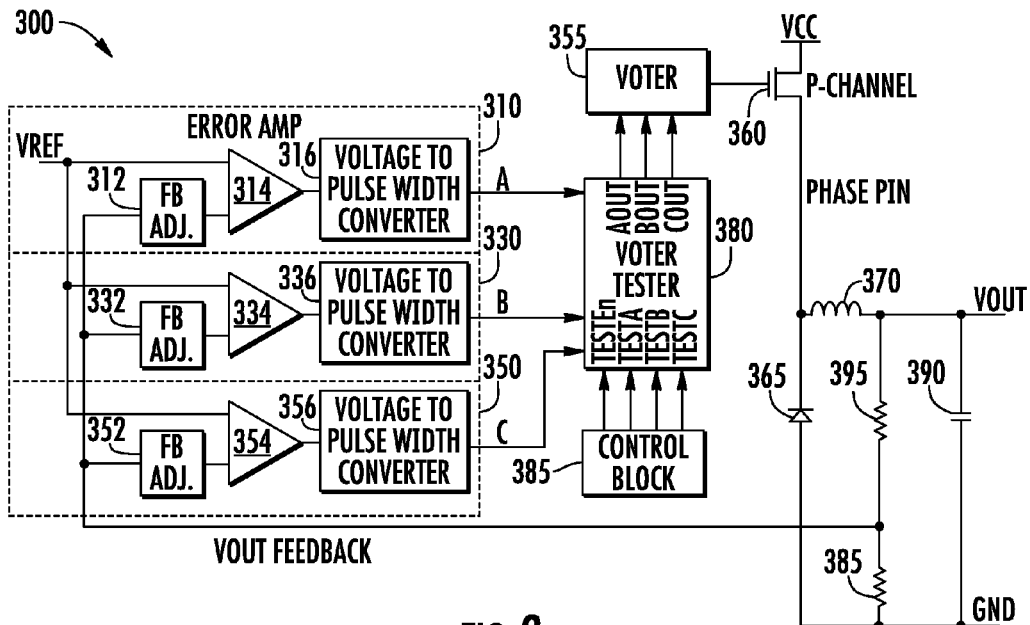
FIG. 3 is a block diagram of a pulse-width modulated DC-DC converter, in accordance with one embodiment of the present invention.

FIG. 3 is a simplified schematic diagram of an exemplary asynchronous pulse-width modulated (PWM) DC-DC voltage converter 300 having a voter tester 380, in accordance with one embodiment of the present invention. Voter tester 380 is adapted to enable testing of each of the three channels of the voltage to pulse width converters 316, 336, and 356. It is understood that the present invention is equally applicable to synchronous DC-DC converters, which may be achieved by replacing diode 365 with an N-channel transistor whose gate terminal may be driven by a second voter (not shown). The P-Channel transistor 360 may also be replaced with an re-channel transistor after an inversion of its gate signal.

PWM voltage regulator 300 is shown as including p-channel transistor 360, diode 365, inductor 370, capacitor 390, resistors 395, 385, voter 355, voter tester 380, control block 385 and three redundant channels 310, 330 and 350. Each redundant channel is shown as including a feedback adjust block, an error amplifier, and a voltage to pulse width converter. Redundant channel 310 is shown as including a feedback adjust block 312, an error amplifier 314, and a voltage to pulse width converter 316 that generates redundant signal A. Redundant channel 330 is shown as including a feedback adjust block 332, an error amplifier 334, and a voltage to pulse width converter 336 that generates redundant signal B. Redundant channel 350 is shown as including a feedback adjust block 352, an error amplifier 354, and a voltage to pulse width converter 356 that generates redundant signal C.

Each redundant channel receives the feedback signal Vout Feedback representative of the output voltage VOUT of PWM DC-DC voltage converter 300. Each error amplifier is adapted to compare a reference voltage (Vref) to the feedback voltage it receives from an associated feedback adjust block and to modulate, in response, the pulse width generated by the associated voltage to pulse width converter in order to minimize the difference between the reference voltage and the corresponding feedback voltage. Voter 355 may be a majority voter generating a logic low output state if two or more of its inputs are low, and a logic high output state if two or more of its inputs are high. The feedback adjust blocks compensate for various sources of mismatch between the three redundant channels (such as the different input offset voltages of their respective error amplifiers) to keep all three redundant channels producing a similar output pulse width supplied to the voter.

Figure 4:
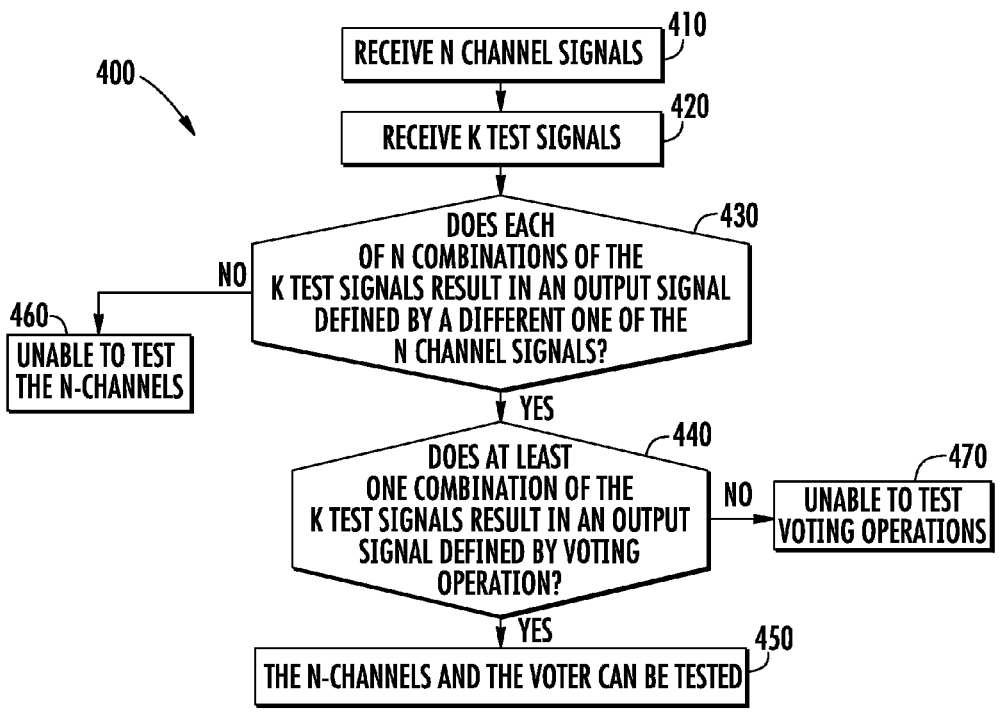
FIG. 4 is a flowchart of steps performed to test redundant channels using test signals, in accordance with one embodiment of the present invention.

FIG. 4 is a flowchart 400 of steps performed to allow testing N redundant channels using K test signals, in accordance with one embodiment of the present invention. To perform the testing, the N redundant channel signals 410 and the K test signals are received 420. The K test signals are then varied to cause 430, in response to each of N combinations of the K test signals, an output signal to have a value defined by a different one of the redundant channel signals. If so, the K test signals are varied so as to cause 440, in response to at least one logic combination of the K test signals, the output signal to have a value defined by a voting operation. If it is determined 430 that in response to each of N combinations of the K test signals, the output signal does not have a value defined by a different one of the redundant channel signals, a determination is made 460 that the N channels cannot be tested. If it is determined 440 that in response to at least one logic combination of the K test signals, the output signal does not have a value defined by the voting operation, a determination is made that the voting operation cannot be tested. If it is determined 440 that in response to at least one logic combination of the K test signals, the output signal has a value defined by the voting operation, the testing operation is detected as having passed 450.

The above embodiments of the present invention are illustrative and not limiting. Various alternatives and equivalents are possible. The invention is not limited by the type of voter or the number of redundant channels supplying redundant signals to the voter. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A voter tester comprising:
   a first set of K input terminals adapted to receive K test signals; and
   a second set of N input terminals adapted to receive N channel signals generated by N redundant circuits;

wherein in response to logic combinations of the test signals, the voter tester generates M output signals, and wherein in response to at least one logic combination of the test signals, a voter responsive to the voter tester generates Q voted output signals, wherein N, K, M and Q are integer numbers.

2. The voter tester of claim 1, wherein each of the M output signals is defined by a different one of the N redundant channel signals.

3. The voter tester of claim 1 wherein the voter tester further comprises a test enable/disable signal, wherein if said test enable/disable signal is in a first logic state the voter generates a voted output signal, and if said test enable/disable signal is in a second logic state the voter generates an output signal supplied by one of the N redundant input circuits.

4. The voter tester of claim 1 wherein the voter tester generates N output signals.

5. The voter tester of claim 1 wherein the Q output signals of the voter comprise an output signal defined by a majority of the M signals received from the voter tester.

6. The voter tester of claim 1 further comprising a serial interface port adapted to receive the K test signals serially.

7. The voter tester of claim 1 further comprising a parallel interface adapted to receive the K test signals in parallel.

8. The voter tester of claim 1 further comprising a plurality of single event transient hardened logic gates.

9. The voter tester of claim 1 further comprising:
substantially similar delay paths each disposed between one of the N input channel signals and an associated one of the M output signals.

10. A method of testing N redundant circuits feeding a voter circuit, the method comprising:
receiveng K test signals;
receiving N channel signals generated by the N redundant circuits;
enabling the voter tester circuit to generate M output signals; and
enabling the voter circuit to generate Q voted output signals in response to the M output signals and at least one logic combination of the test signals, wherein N, M, K and O are integer numbers.

11. The method of claim 10 further comprising:
enabling the voter circuit to generate a voted output signal in response to a first logic state of an enabling/disabling signal; and
enabling the voter circuit to generate an output signal supplied by one of the redundant channels in response to a second logic state of the enabling/disabling signal.

12. The method of claim 10 wherein K is an odd integer number equal to N+1.

13. The method of claim 10 further comprising receiving the K test signals via one of a serial interface port and a parallel interface port.

14. The method of claim 11 further comprising:
delivering the enabling/disabling signal to at least one single-event transient hardened logic gate.

15. The method of claim 10 further comprising:
forming substantially similar delay paths each disposed between a different one of the N input channel signals and an associated one of the M output signals.

16. A pulse-width modulated DC-DC converter comprising:
an inductor;
a transistor adapted to supply current to the inductor;
a voter circuit coupled to a gate terminal of the transistor;
N-redundant circuits supplying N channel signals; and
a voter tester comprising:
a first set of input terminals adapted to receive at least one test signal; and
a second set of input terminals adapted to receive a plurality of channel signals generated by redundant circuits; wherein in response to logic combinations of the at least one test signal, the voter tester generates output signals defined by the plurality of channel signals, and
wherein in response to the output signals of the voter tester, the voter circuit generates a voted output signal.

* * * * *